(12) United States Patent
Gyarmati

(10) Patent No.: US 12,723,646 B2
(45) Date of Patent: Sep. 1, 2026

(54) OIL GUIDING ARRANGEMENT FOR A TRANSMISSION

(71) Applicant: ZF Friedrichshafen AG, Friedrichshafen (DE)

(72) Inventor: Tamas Gyarmati, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/953,889

(22) Filed: Nov. 20, 2024

(65) Prior Publication Data

US 2025/0164004 A1 May 22, 2025

(30) Foreign Application Priority Data

Nov. 20, 2023 (DE) ......................... 102023211492.5

(51) Int. Cl.
*F16H 57/04* (2010.01)
*F16H 57/02* (2012.01)

(52) U.S. Cl.
CPC ....... *F16H 57/0471* (2013.01); *F16H 57/043* (2013.01); *F16H 2057/02043* (2013.01)

(58) Field of Classification Search
CPC ............. F16C 33/6677; F16H 57/0471; F16H 57/043; F16H 57/0479
See application file for complete search history.

(56) References Cited

U.S. PATENT DOCUMENTS 4,221,279 A 9/1980 Jones et al.
4,766,773 A * 8/1988 Yamaguchi ........... F16H 3/0915 184/6.12
4,842,100 A * 6/1989 Cameron ............ F16C 33/6659 184/6.12
11,486,489 B2 * 11/2022 Willburger .......... F16H 57/0471
2014/0141918 A1 5/2014 Fukami et al.
2023/0265917 A1 * 8/2023 Brehmer .............. B60K 7/0007 475/150

FOREIGN PATENT DOCUMENTS

DE 2543481 A1 4/1977

OTHER PUBLICATIONS

German Search Report for Application No. 102023211492.5 dated Jun. 21, 2024.

* cited by examiner

*Primary Examiner* — Jake Cook
(74) *Attorney, Agent, or Firm* — Dority & Manning, P.A.

(57) ABSTRACT

An oil guiding arrangement for a transmission having a first output shaft, a second output shaft, and a bearing for rotatably supporting the first output shaft at the second output shaft, the second output shaft having an offset section extending in a radial direction and defining an oil channel extending in an axial direction for supplying oil to the bearing. The oil guiding arrangement includes a stationary component defining a main oil channel and an opening, where the opening opens from the oil channel into an oil volume. The second output shaft is rotatably supported at the stationary component with the opening of the main oil channel extending opposite in the axial direction to the offset section of the second output shaft. The oil channel for the bearing of the first output shaft is fluidly connected to the main oil channel via the oil volume.

10 Claims, 2 Drawing Sheets

OIL GUIDING ARRANGEMENT FOR A TRANSMISSION

CROSS-REFERENCE TO RELATED APPLICATION

The present application is related and has right of priority to German Patent Application No. 10 2023 211 492.5 filed on Nov. 20, 2023, the entirety of which is incorporated by reference for all purposes.

FIELD OF THE INVENTION

The present invention relates generally to an oil guiding arrangement for a transmission, a transmission for a vehicle, and a vehicle.

BACKGROUND

Oil guiding arrangements are known which supply oil to different components of the transmission for lubrication and cooling. In particular, in the case of a transmission which has a bearing within a rotating shaft, where the bearing rotatably supports an internal second rotating shaft, the oil guidance is complex. In addition, pressurized oil leads to leakage losses.

SUMMARY OF THE INVENTION

It is an object of the present invention to provide an improved oil guiding arrangement which enables oil guidance in a simple manner, ensures good oiling of the components and keeps leakage losses low.

An oil guiding arrangement is applicable to a transmission having a first output shaft, a second output shaft, and a bearing of the first output shaft. The oil guiding arrangement has a stationary component. The stationary component may be a housing. The stationary component forms or defines a main oil channel. The stationary component defines an opening at the main oil channel. The opening may be defined at one end of the main oil channel in the oil flow direction. The opening opens into an oil volume. The opening may be formed as an oil nozzle. The opening may extend in an axial direction. The axial direction may refer to the bearing of the first output shaft. The opening may be oriented obliquely with respect to the axial direction.

The second output shaft is rotatably supported at the stationary component. The second output shaft has an offset section. The offset section extends in a radial direction. The radial direction may refer to the bearing of the first output shaft. The offset section is opposite to the opening of the main oil channel in an axial direction. In this respect, oil may flow from the opening in the direction of the offset section. The first output shaft is rotatably supported at the second output shaft by the bearing. The offset section forms or defines an oil channel for the bearing of the first output shaft. The oil channel for the bearing of the first output shaft may be defined by a cylindrical bore. The oil channel for the bearing of the first output shaft extends in an axial direction. A centrifugal force on the oil may thereby be kept low. The oil channel for the bearing of the first output shaft may extend, for example, outward in a radial direction. A centrifugal force may thereby be used for conveying the oil to the bearing of the first output shaft. The oil channel for the bearing of the first output shaft may be oblique with respect to the radial direction. The oil channel for the bearing of the first output shaft may be fluidly connected with the bearing of the first output shaft. The oil channel for the bearing of the first output shaft is fluidly connected to the main oil channel via the oil volume.

If two elements are in fluid communication with each other, a fluid, for example oil, may be guided from one element to the other element. In this case, the fluid communication may be leak-free so that the oil is guided substantially completely from one element to the other element.

An oil flow direction is the direction of the oil in which it moves in the oil guiding arrangement in order to reach the components which are oiled. In particular, a start of an oil channel is positioned upstream of an end of an oil channel in the oil flow direction.

In an embodiment, the offset section of the second output shaft may cover the opening of the main oil channel in the radial direction. The offset section may begin within the opening in the radial direction and end outside the opening in the radial direction.

In an embodiment, the transmission may have a first bearing of the second output shaft and a second bearing of the second output shaft which rotatably support the second output shaft at the stationary component. The first bearing of the second output shaft and the second bearing of the second output shaft may each be a needle bearing or plain bearing. The oil volume may be in a region between the first bearing of the second output shaft and the second bearing of the second output shaft.

The first bearing of the second output shaft and the second bearing of the second output shaft may be spaced apart from each other in the axial direction. The first bearing of the second output shaft and the second bearing of the second output shaft may be spaced apart from each other in the radial direction. Thereby, the oil channel for the bearing of the first output shaft may be defined in the radial direction between the first bearing and the second bearing of the second output shaft. The oil volume may be between the first bearing of the second output shaft and the second bearing of the second output shaft in the axial direction. The oil volume may be between the first bearing of the second output shaft and the second bearing of the second output shaft in the radial direction. The oil volume may be delimited in the axial direction by the offset section. The oil volume may be delimited by a section of the stationary component. The oil volume may be delimited by a section on an outer circumference of the second output shaft.

In an embodiment, the offset section may be between bearing seats of the second output shaft for the first bearing and the second bearing of the second output shaft.

The second output shaft may have a bearing seat for the first bearing of the second output shaft and a bearing seat for the second bearing of the second output shaft. The bearing seats of the second output shaft may each be defined on an outer circumference of a section of the second output shaft. The stationary component may have a bearing seat for the first bearing of the second output shaft and a bearing seat for the second bearing of the second output shaft. In particular, the first bearing of the second output shaft and the second bearing of the second output shaft may each be in the respective bearing seat, in a gap between the second output shaft and the stationary component.

The offset section may extend sectionwise between the bearing seats of the second output shaft. The offset section may extend in the radial direction. The offset section may extend in the axial direction. The offset section may extend in the radial direction and in the axial direction.

In an embodiment, the oil guiding arrangement may have a collecting component. The collecting component may be between the bearing seats for the first bearing and the second bearing of the second output shaft. The collecting component may extend sectionwise between the bearing seats of the second output shaft. The collecting component may extend in the radial direction. The collecting component may extend in the axial direction. The collecting component may extend in the radial direction and the axial direction.

In an embodiment, the collecting component may have a collecting surface which is configured such that it collects oil from the opening of the main oil channel in the radial direction toward the outside and guides it to the oil channel for the bearing of the first output shaft in the axial direction.

The collecting surface may end close to the opening of the main oil channel such that a low oil pressure of the oil in the main oil channel is sufficient to convey oil across a gap between the collecting surface and the opening of the main oil channel in the axial direction. The collecting surface may delimit the oil volume in the radial direction toward the outside. The collecting surface may cover the oil channel for the bearing of the first output shaft in the radial direction. The collecting surface may extend in a curved manner in the radial direction across the oil channel for the bearing of the first output shaft. The collecting surface may be rotationally symmetrical. The collecting surface, together with the offset section, may form or define a circumferentially extending trough which is open in the radial direction toward the inside.

In an embodiment, the collecting component may be rotationally fixedly connectable to the second output shaft. The collecting component may be rotationally fixedly connected to the second output shaft by a screw connection. The collecting component may have a circumferentially extending undercut. The undercut may be elastically hooked onto a circumferentially extending projection of the second output shaft and coupled to the second output shaft. The collecting component may be rotationally fixedly connectable to the offset section of the second output shaft.

If two elements are coupled to each other, a movement of one element causes a reaction of the other element. For example, a connection may be a form-fit or friction-fit connection. Further elements may be provided between the elements. For example, a connection may be rotationally fixed. A rotationally fixed connection of two elements is understood to mean a connection in which the two elements are rigidly coupled to each other in all intended states, for example of a transmission, so that they exhibit substantially the same rotational speed. The elements may be present as individual components rotationally fixedly connected to each other or also in one piece.

In an embodiment, the collecting surface of the collecting component may overlap the offset section of the second output shaft. The collecting surface may cover a section of the offset section in the radial direction. The collecting surface may protrude in the radial direction outwardly beyond the offset section. The collecting surface may be within the offset section in the radial direction.

In an aspect, a transmission for a vehicle is provided. The transmission has an input element, a first output shaft, a second output shaft, a first gearset, a second gearset, and the oil guiding arrangement according to any of the preceding aspects and embodiments. The input element is configured for transmitting a torque to the first gearset. The first gearset and the second gearset are mechanically operatively connected to each other such that a torque is transmittable from the first gearset to the second gearset. The first output shaft is configured for outputting a torque from the first gearset. The second output shaft is configured for outputting a torque from the second gearset. The first gearset and the second gearset may have the function of a differential.

In an embodiment, the first gearset is a first planet gearset. The first planet gearset may have a first sun gear, a first planet gear, and a first ring gear. The first sun gear may be in engagement with the first planet gear. The first planet gear may be in engagement with the first ring gear. The second gearset is a second planet gearset. The second planet gearset may have a second sun gear, a second planet gear, and a second ring gear. The second sun gear may be in engagement with the second planet gear. The second planet gear may be in engagement with the second ring gear. The first gearset and the second gearset may be arranged in the same plane in the axial direction.

In an aspect, a vehicle has drive wheels and a transmission according to any of the preceding aspects and embodiments. The first output shaft is configured for driving one of the drive wheels. The second output shaft is configured for driving another one of the drive wheels.

DETAILED DESCRIPTION

Figure 1:
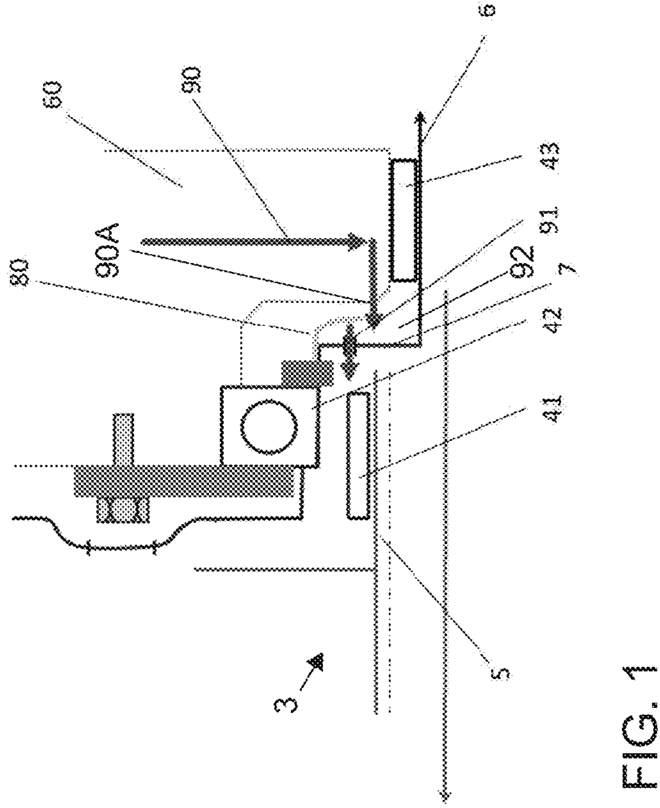
FIG. 1 shows a sectional view of a schematic representation of an embodiment of an oil guiding arrangement.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of a schematic representation of an embodiment of an oil guiding arrangement. The oil guiding arrangement is applicable to a transmission 3 having a first output shaft 5, a second output shaft 6, and a bearing 41 of the first output shaft 5. The transmission 3 is described in more detail below with reference to FIG. 2. The oil guiding arrangement includes a stationary component 60 and a collecting component 80. The second output shaft 6 defines an oil channel 91 for the bearing 41 of the first output shaft 5, where the oil channel 91 extends in an axial direction. As a result, the oil may be guided to the bearing 41 of the first output shaft 5 in a nearly pressure-free manner.

Further details of the oil guiding arrangement are described in more detail below.

The second output shaft 6 is rotatably supported at the stationary component 60 by a first bearing 42, in the present case a grooved ball bearing. The second output shaft 6 is rotatably supported at the stationary component 60 by a second bearing 43, in the present case a needle bearing. The first bearing 42 of the second output shaft 6 and the second bearing 43 of the second output shaft 6 are arranged spaced apart from each other in the axial direction and in a radial direction. The first output shaft 5 is rotatably supported at the second output shaft 6 by the bearing 41. The first output shaft 5 and the second output shaft 6 are arranged coaxially with each other. A section of the first output shaft 5 is within the second output shaft 6 in the radial direction and overlaps the second output shaft 6 in the axial direction.

The stationary component 60 defines a main oil channel 90. The main oil channel 90 is defined by a bore which extends in the axial direction at the end in the oil flow direction. The main oil channel 90 includes an opening 90A which opens into an oil volume 92, the opening 90A being an oil nozzle. The oil volume 92 is provided between the first bearing 42 of the second output shaft 6 and the second bearing 43 of the second output shaft 6.

The second output shaft 6 includes an offset section 7 which extends in the radial direction. The offset section 7 is between bearing seats of the second output shaft 6 for the first bearing 42 and the second bearing 43 of the second output shaft 6. The offset section 7 is a step of the second output shaft 6 in the present case. The offset section 7 is arranged opposite to or facing the opening 90A of the main oil channel 90 in the axial direction. The offset section 7 covers the opening 90A of the main oil channel 90 in the radial direction.

The collecting component 80 is between the bearing seats for the first bearing 42 and the second bearing 43 of the second output shaft 6. The collecting component 80 has a collecting surface which is configured such that it collects oil from the opening 90A of the main oil channel 90 in the radial direction towards the outside and guides it to the oil channel 91 for the bearing 41 of the first output shaft 5 in the axial direction. The collecting component 80 is rotationally fixedly connected to the second output shaft 6.

In the present case, the collecting component 80 is connected, by a clamping geometry, to an outer circumference of a section of the second output shaft 6 and rotates together with the second output shaft 6 about the axis of rotation of the second output shaft 6. The collecting surface of the collecting component 80 extends in a curved manner in the radial direction toward the inside in the region of the offset section 7. The collecting surface, together with the offset section 7, defines a circumferentially extending trough which is open in the radial direction toward the inside. The collecting surface extends in the radial direction outside the opening 90A of the main channel 90. The collecting component 80 delimits the oil volume 92 in the radial direction. The end of the collecting component 80 in the radial direction is offset radially outward with respect to the opening 90A of the main oil channel 90 to such an extent that the oil exiting from the opening 90A of the main oil channel 90 may be caught by the collecting component 80 in the radial direction.

The oil channel 91 for the bearing 41 of the first output shaft 5 in the offset section 7 is offset radially outward from the opening 90A of the main oil channel 90. The oil channel 91 for the bearing 41 of the first output shaft 5 extends in the axial direction towards the bearing 41 of the first output shaft 5. The oil channel 91 for the bearing 41 of the first output shaft 5 is defined a bore in the offset section 7.

Oil exiting from the opening 90A of the main oil channel 90 flows in the radial direction toward the inside and meets an outer surface of the second output shaft 6. Due to the rotation of the second output shaft 6, the oil is guided in the radial direction toward the outside at the offset section 7 until it meets the collecting component 80. The oil builds up on the collecting component 80 until it has built up in the radial direction toward the inside to such an extent that it may flow out under a built-up pressure via the oil channel 91 of the bearing 41 of the first output shaft 5.

Figure 2:
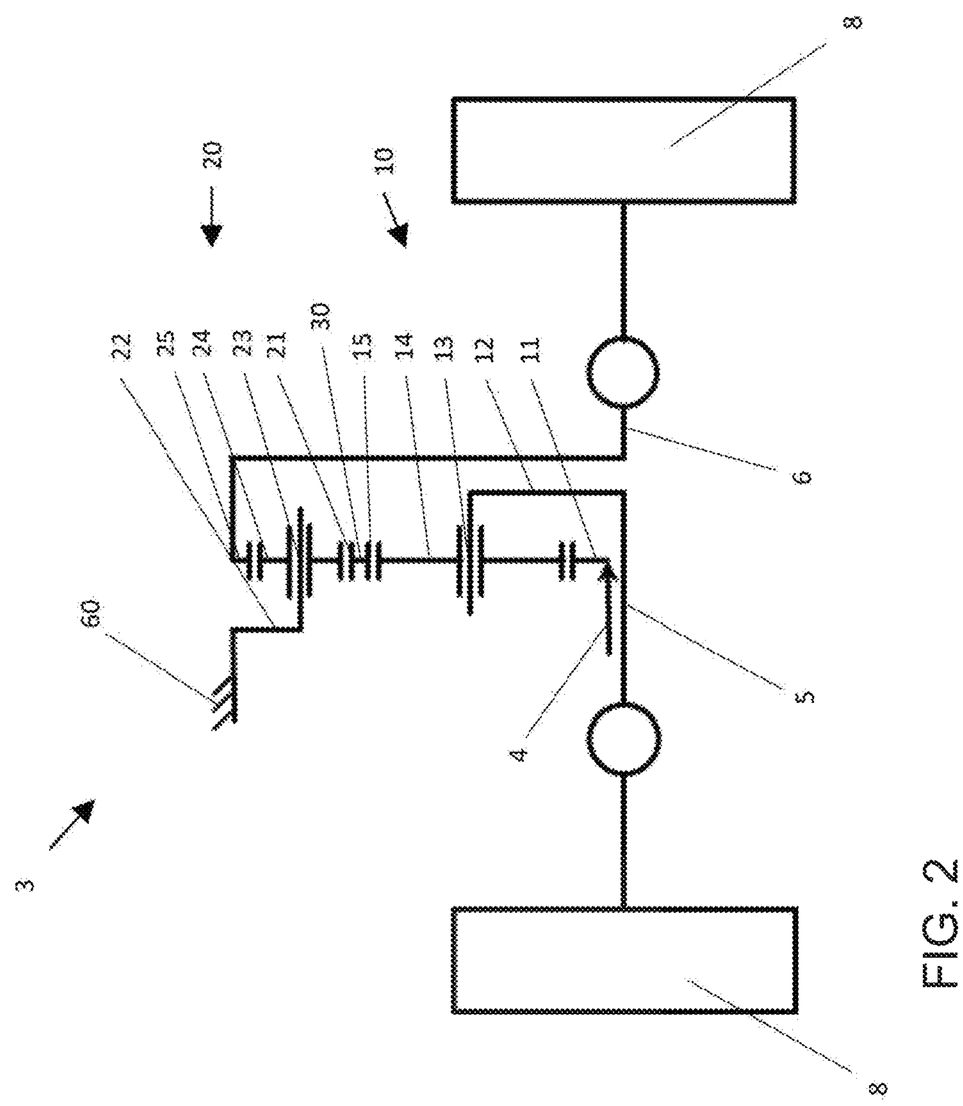
FIG. 2 shows a schematic representation of an embodiment of a transmission with the oil guiding arrangement of FIG. 1.

FIG. 2 shows a schematic representation of an embodiment of a transmission 3 with the oil guiding arrangement. The transmission 3 includes an input element 4, a first output shaft 5, a second output shaft 6, a first gearset, in the present case a first planet gearset 10, a second gearset, in the present case a second planet gearset 20, and an oil guiding arrangement, such as according to FIG. 1.

The first planet gearset 10 includes a first sun gear 11, a first planet carrier 12, a number of first planet bolts 13 and first planet gears 14, and a first ring gear 15. The first sun gear 11 is in engagement with one of the first planet gears 14. One of the first planet gears 14 is in engagement with the first ring gear 15 and rotatably supported on one of the first planet bolts 13. The first planet bolts 13 are connected to the first planet carrier 12.

The second planet gearset 20 includes a second sun gear 21, a second planet carrier 22, a number of second planet bolts 23 and planet gears 24, and a second ring gear 25. The second sun gear 21 is in engagement with one of the second planet gears 24. One of the second planet gears 24 is in engagement with the second ring gear 25 and rotatably supported on one of the second planet bolts 23. The second planet bolts 23 are connected to the second planet carrier 22. The second planet carrier 22 is connected to the stationary component 60.

The first ring gear 15 and the second sun gear 21 are part of a sun-ring-gear 30. The sun-ring-gear 30 includes the first ring gear 15 on an inner circumference. The sun-ring-gear 30 includes the second sun gear 21 on an outer circumference. The first planet gearset 10 and the second planet gearset 20 are arranged in the same plane in the axial direction.

The input element 4 is configured for transmitting a torque to the first sun gear 11. A torque may be transmitted from the first planet gearset 10 to the second planet gearset 20 by the sun-ring-gear 30. The first output shaft 5 is rotationally fixedly connected to the first planet carrier 12 and transmits a torque to a drive wheel 8 of a vehicle for driving the vehicle. The second output shaft 6 is rotationally fixedly connected to the second ring gear 25 and transmits a torque to a drive wheel 8 of a vehicle for driving the vehicle.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

3 transmission
4 input element
5 first output shaft
6 second output shaft
7 offset section
8 drive gear
10 first planet gearset
11 first sun gear of the first planet gearset
12 first planet carrier of the first planet gearset
13 first planet bolt of the first planet gearset
14 first planet gear of the first planet gearset
15 first ring gear of the first planet gearset

20 second planet gearset
21 second sun gear of the second planet gearset
22 second planet carrier of the second planet gearset
23 second planet bolt of the second planet gearset
24 second planet gear of the second planet gearset
25 second ring gear of the second planet gearset
30 sun-ring-gear
41 bearing of the first output shaft
42 first bearing of the second output shaft
43 second bearing of the second output shaft
60 stationary component
80 collecting component
90 main oil channel
90A opening of main oil channel
91 oil channel for bearings of the first output shaft
92 oil volume

The invention claimed is:

1. An oil guiding arrangement for a transmission (3) comprising a first output shaft (5), a second output shaft (6), and a bearing (41) of the first output shaft (5), the first output shaft (5) being rotatably supported at the second output shaft (6) by the bearing (41), the second output shaft (6) comprising an offset section (7) extending in a radial direction, the offset section (7) defining an oil channel (91) extending in an axial direction for supplying oil to the bearing (41) of the first output shaft (5), the oil guiding arrangement comprising:

a stationary component (60), the stationary component (60) defining a main oil channel (90) and an opening (90A), the opening (90A) opening from the oil channel (90) into an oil volume (92), the second output shaft (6) being rotatably supported at the stationary component (60) with the opening (90A) of the main oil channel (90) extending opposite in the axial direction to the offset section (7) of the second output shaft (6), the oil channel (91) for the bearing (41) of the first output shaft (5) being fluidly connected to the main oil channel (90) via the oil volume (92), wherein the transmission (3) comprises a first bearing (42) and a second bearing (43), the first bearing (42) and the second bearing (43) rotatably supporting the second output shaft (6) on the stationary component (60), the oil volume (92) being defined between the first bearing (42) and the second bearing (43).

2. The oil guiding arrangement of claim 1, wherein the opening (90A) of the main oil channel (90) is covered in the radial direction by the offset section (7) of the second output shaft (6).

3. The oil guiding arrangement of claim 1, wherein the offset section (7) is between a bearing seat of the second output shaft (6) for the first bearing (42) and a bearing seat of the second output shaft (6) for the second bearing (43).

4. The oil guiding arrangement of claim 1, further comprising a collecting component (80) between a bearing seat of the second output shaft (6) for the first bearing (42) and a bearing seat of the second output shaft (6) for the second bearing (43).

5. The oil guiding arrangement of claim 4, wherein the collecting component (80) comprises a collecting surface for guiding oil outside in the radial direction from the opening (90A) of the main oil channel (90) towards the oil channel (91) in the axial direction for supplying oil to the bearing (41) of the first output shaft (5).

6. The oil guiding arrangement of claim 5, wherein the collecting component (80) is rotationally fixedly connectable to the second output shaft (6).

7. The oil guiding arrangement of claim 5, wherein the collecting surface of the collecting component (80) overlaps the offset section (7) of the second output shaft (6).

8. A transmission (3) for a vehicle, the transmission (3) comprising:

the oil guiding arrangement of claim 1;

an input element (4);

a first gearset, the input element (4) being configured for transmitting torque to the first gearset;

a second gearset, the first gearset and the second gearset being mechanically operatively connected to each other such that torque is transmittable from the first gearset to the second gearset;

the first output shaft (5) configured for outputting torque from the first gearset; and the second output shaft (6) configured for outputting torque from the second gearset.

9. The transmission (3) of claim 8, wherein the first gearset is a first planet gearset (10) and the second gearset is a second planet gearset (20).

10. A vehicle (1), comprising:

drive wheels (8); and the transmission (3) of claim 8, the first output shaft (5) of the transmission (3) being configured for driving one of the drive wheels (8), the second output shaft (6) of the transmission (3) being configured for driving another one of the drive wheels (8).

* * * * *